No. 708,635. Patented Sept. 9, 1902.
E. S. GRISE.
NUT LOCK.
(Application filed June 14, 1901.)

(No Model.)

Witnesses
Inventor
Edward S. Grise.
by Albert Popkins
his Attorney.

UNITED STATES PATENT OFFICE.

EDWARD S. GRISE, OF OTTAWA, OHIO.

NUT-LOCK.

SPECIFICATION forming part of Letters Patent No. 708,635, dated September 9, 1902.

Application filed June 14, 1901. Serial No. 64,554. (No model.)

*To all whom it may concern:*

Be it known that I, EDWARD S. GRISE, a citizen of the United States, residing at Ottawa, in the county of Putnam and State of Ohio, have invented certain new and useful Improvements in Nut-Locks; and I do hereby declare the following to be a full, clear, and exact description of the invention, such as will enable others skilled in the art to which it appertains to make and use the same.

My invention relates to certain improvements in nut-locking devices, and has for its object to provide an improved spring locking-washer which will keep the nut firmly locked in position under all circumstances.

In carrying out my invention I employ a double washer or washers so bent as to form two leaves or members united at the bending-point and having an inherent tendency to spring apart, the spring action tending to bind the threads of the nut and bolt together and the nut being prevented from turning by a tongue formed integral with the washer.

Figure 1:
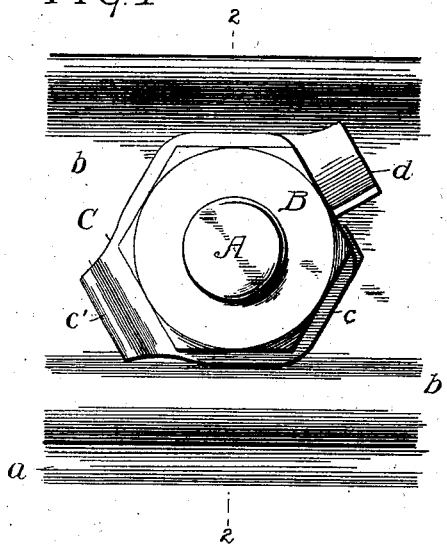
Figure 2:
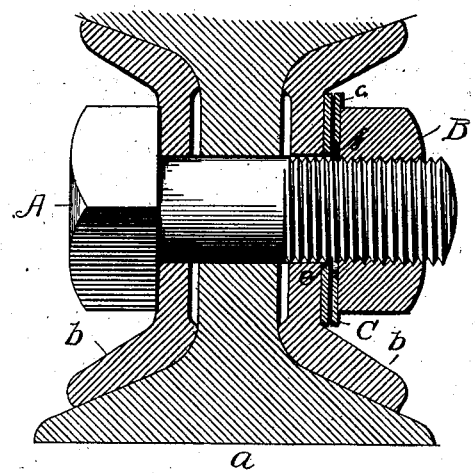
Figure 3:
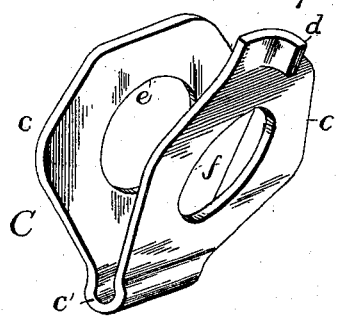
Figure 4:
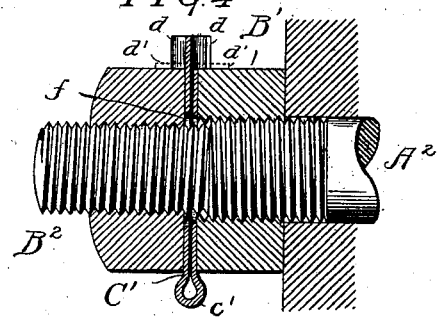

In the accompanying drawings, Figure 1 is an elevation of a nut-lock made in accordance with my invention and illustrating the application of the same to a rail-joint. Fig. 2 is a transverse sectional elevation of the same. Fig. 3 is a perspective view of the locking-washer detached; and Fig. 4 is a view illustrating a modified form of washer, more fully referred to hereinafter.

Referring to the drawings, A represents a bolt of ordinary character, and B a suitable nut thereon. The nut and bolt are shown in Figs. 1 and 2 as applied to a rail-joint, *a* illustrating the rail and *b* the angle-bars or fish-plates on either side of the same.

The washer C is formed of two integral leaves *c*, of spring metal, bent at their meeting-point *c'* and curved outward in opposite directions beyond the planes of the leaves, so as to retain to the fullest degree the spring action without tendency to break when the two parts are forced close together, the bending-point having an extended circular curve to permit free bending in either direction, these two leaves having an inherent tendency to spring apart, and when contracted or pressed together by the screwing up of the nut act to force the threads of the nut and bolt into close contact. In the leaves of the washer are formed openings *e f* for the passage of the bolt, the opening *f* in that portion of the washer in contact with the nut being somewhat elongated, as shown, so that when the nut is being tightened and the leaf forced toward its fellow it will not catch or bind on the threads of the bolt. The outer leaf *c* is provided at its top with a tongue *d*, bent outwardly and adapted to engage behind the corners of the nut as they successively pass it in being turned, this tongue holding the nut against any retrograde or loosening movement and locking it in any position to which it may be tightened. The leaves or members *c* are formed of tempered steel, while the end portions *d* are preferably malleable, so that they may when necessary be bent over upon the nut, either to increase the surface in contact with the side of the nut or, if necessary, to enable its downward bending, as shown at *d'* in dotted lines, Fig. 4, this latter in some cases being deemed preferable.

It will be noted that the sides of the washer as shown in Figs. 1, 2, and 3 are flattened, so that they may engage with the outwardly-flaring edges of the angle-bars *b* and prevent the turning of the said washer, the curved spring end *c'* being left free. This structure for a single nut is of the character best adapted for railway-work. Where two nuts, as B' and B², are employed on a right and left handed threaded bolt A², as shown in Fig. 4, both leaves or members are provided with tongues *d*, one to engage each of the nuts, and so lock them against each other.

Having thus described my invention, what I claim, and desire to secure by Letters Patent, is—

A nut-lock comprising a piece of tempered sheet metal having a single central bend to form leaves, and curved outward at the bend in opposite directions beyond the planes of the leaves, each of said leaves having an opening one of which is enlarged, and a malleable holding-tongue projecting from one of the leaves, the edges of said leaves being flattened, for the purpose described.

In testimony whereof I affix my signature in presence of two witnesses.

EDWARD S. GRISE.

Witnesses:
 JAMES P. LEASURE,
 HENRY WISE.